United States Patent [19]

Gloor et al.

[11] Patent Number: 4,654,199
[45] Date of Patent: Mar. 31, 1987

[54] HIGH-POWER OZONIZER

[75] Inventors: Urs Gloor, Baden; Michael Hirth, Unterentfelden; Ulrich Kogelschatz, Hausen, all of Switzerland

[73] Assignee: BBC Brown, Boveri & Company, Limited, Baden, Switzerland

[21] Appl. No.: 743,891

[22] Filed: Jun. 12, 1985

[30] Foreign Application Priority Data

Jun. 27, 1984 [CH] Switzerland .................. 3107/84

[51] Int. Cl.⁴ ............................................. B01J 19/08
[52] U.S. Cl. ........................... 422/186.19; 422/186.07; 422/186.18; 422/186.2
[58] Field of Search ........... 422/186.2, 186.19, 186.18, 422/186.11, 186.07, 186.08; 204/17.6; 313/32, 30, 290

[56] References Cited

U.S. PATENT DOCUMENTS 1,579,162  3/1926  Starke et al. ............... 422/186.19 X
1,834,705  12/1931  Hartman ..................... 422/186.19
3,661,763  5/1972  Cremer et al. ............... 422/186.17
3,663,418  5/1972  Kawahata .................... 422/186.11
3,899,685  8/1975  Francis et al. ............. 422/186.19 X
4,025,441  5/1977  Tabata et al. ............... 422/186.19

FOREIGN PATENT DOCUMENTS 0011894  1/1979  Japan ........................ 204/17.6
0133493  10/1979  Japan ....................... 422/186.19

Primary Examiner—Herbert B. Guynn
Assistant Examiner—S. Wolffe
Attorney, Agent, or Firm—Oblon, Fisher, Spivak, McClelland & Maier

[57] ABSTRACT

Through modular construction of the ozone generator from block modules (1) of metal which have through holes (2) as outer electrodes and can be directly cooled, the required mechanical tolerances can be maintained. In particular, if the high voltage electrode (8) and the dielectric (11) is cooled, high power densities can be achieved.

22 Claims, 8 Drawing Figures

HIGH-POWER OZONIZER

FIELD OF THE INVENTION

The invention relates to an ozone generator consisting of one or more cooled tubular ozonizers. Each tubular ozonizer has an outer tubular electrode, an inner electrode disposed concentrically within the outer electrode, and a dielectric tube placed between the two electrodes.

BACKGROUND OF THE INVENTION

Recent investigations have shown that the power density in tube ozonizers can be increased to 25 kW/m$^2$ if the ozonizer is cooled on two sides and the discharge gap is made very narrow. This imposes high requirements on the mechanical tolerances. Thus, in the German Offenlegungsschrift No. 23 33 311 reference is expressly made to the importance of the tolerances in connection with double cooling.

Traditional ozonizers for industrial applications exhibit a construction such as is shown in German Offenlegungsschrift No. 32 20 018, in particular in FIG. 9. A multiplicity of ozonizer tubes are accommodated in a common shell. Each ozonizer tube consists of an outer metal tube in which an internally metallised glass tube is concentrically disposed with the formation of an annular gap. The metal tubes are welded into a kind of tube base at both ends of the shell. Cooling liquid is fed into the space bounded by the casing of the shell and the two tube bases. In this way the metal tubes (at earth potential), which form the outer electrodes, are cooled.

In addition to narrowly toleranced glass tubes, this type of construction also requires narrowly toleranced metal tubes in order to keep the width of the gap as constant as possible everywhere. In addition, extensive precautions have to be taken to ensure that the metal tubes do not distort when fitted into the tube bases. A further inadequacy of this construction is evident in the fact that different shell sizes have to be made available for different production rates. Thus modularisation is limited by the number of shells and their size.

OBJECTS OF THE INVENTION

The principal object of the invention, is to provide a tubular ozonizer which makes possible a modular construction of the ozone generator. A further object of the invention is to provide a tubular ozonizer in which mechanical tolerances in relation to the discharge gap are precisely maintained.

SUMMARY OF THE INVENTION

The construction according to the invention exhibits in particular the advantage that the outer electrodes are largely torsionally rigid and self-supporting. They can be fitted without mechanical and thermal stresses. The ozone generator can therefor be constructed in a modular construction system. Depending on the degree of modularization one or more ozonizer tubes can be incorporated in a single block module without the cooling being impaired. The block modules are manufactured preferably from cast aluminium. In particular, the technology of continuous casting of aluminium is advanced to such an extent that the necessary mechanical tolerances can easily be maintained. In addition, aluminium offers the advantages that on the one hand the holes (outer electrodes) in which the discharges take place can be protected against discharge attacks by anodic oxidation and on the other hand aluminium is an excellent conductor of heat. In this way the discharge dissipation heat can be removed to the cooling points without large temperature gradients. The cooling of the modules can take place in various ways (directly or indirectly):

- directly through cooling holes along the discharge gap or transverse to it;
- indirectly through external cooling tubes between adjacent modules.

In an ozone generator according to the invention the internal cooling can per se be accomplished in accordance with the state of the art, e.g. as proposed in German Offenlegungsschrift No. 25 37 124. It is, however, particularly advantageous if in essence the entire inner cavity of the dielectric tube is filled up, by a heat sink which leaves an expansion gap between itself and the internal wall of the dielectric tube which extends over the entire length and circumference of the heat sink, the heat sink being galvanically coupled to the internal electrode.

In principle, two categories of heat sinks can be used: into the dielectric tube is inserted a cooling tube whose external diameter is only slightly smaller than the internal diameter of the dielectric tube. The remaining annular gap, typically 1–1.5 mm wide, is filled up with a casting compound which conducts heat well, preferably a synthetic resin compound such as is used for sealing electrical elements.

The dielectric tube is filled by casting with a low-melting metal alloy, the cooling channels being cast in at the same time, which can be accomplished, for example, by previously inserting cooling tubes, helixes or spirals.

In both cases it is of essential significance to the invention that both the casting compound and the inserts (cooling tubes etc.) are brought during the filling to temperatures such that, when the casting compound cools, the expansion gap is formed as a result of shrinkage.

The development of the subject of the invention is remarkable for a simple and economic construction. The cooling tube can be manufactured from any suitable material. The heat transfer is only slightly impaired by the relatively thin layer of casting compound even when this consists of synthetic resin.

Further developments of the invention as well as the advantages thereby achievable are explained in more detail below with reference to the examplary embodiments shown in the drawing.

BRIEF DESCRIPTION OF THE DRAWINGS

Various other objects, features, and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PRESENTLY PREFERRED EMBODIMENTS

Figure 1:
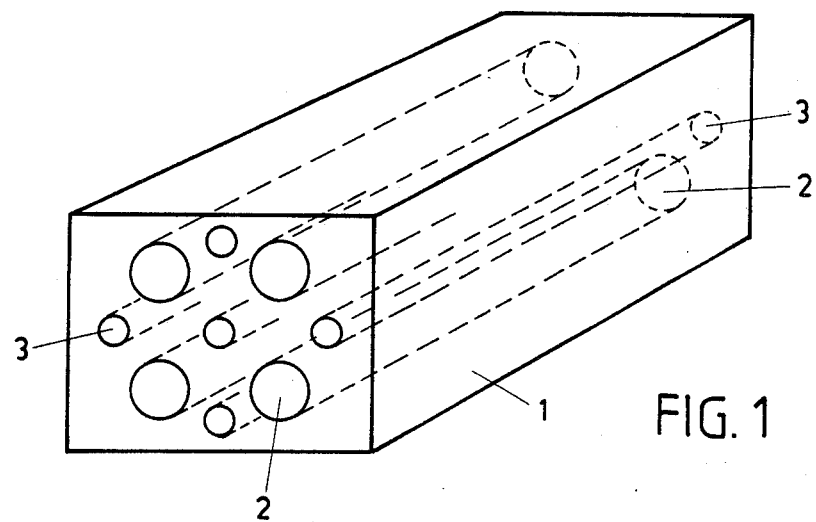
FIG. 1 shows a block module in perspective representation with cooling holes running longitudinally.

FIG. 1 shows a block-like body 1 formed of continuously drawn aluminium with four first through holes 2 running in the longitudinal direction of the body 1 and five second through holes 3 running parallel to them. The first holes 2 form the external limitation of the discharge gap, the second holes 3 form the cooling agent holes. The walls of all the through holes are provided with an anodic oxide layer (not drawn). In the case of the first holes 2, the anodic oxide layer protects against the discharge attack. In the case of the second holes 3, their internal walls are protected against the erosive attack of the cooling agent flowing through them (as a rule water).

Figure 2:
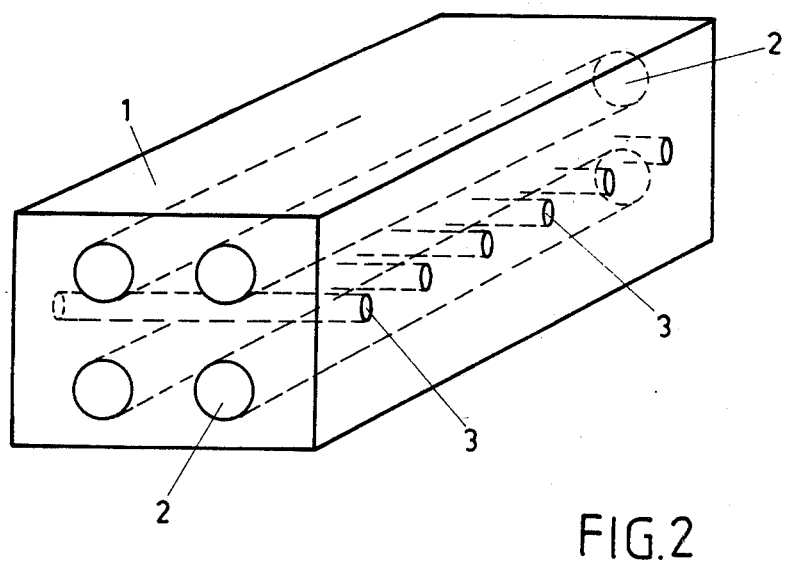
FIG. 2 shows a block module with cooling holes running transversely.

In FIG. 2 the first through holes 2 run in a longitudinal direction of the body 1. The second holes 3 are transverse to the first holes 2 without, however, cutting into the first holes 2.

The individual block modules can be stacked close together on top of and/or beside each other and can be trussed together by known means.

Figure 3:
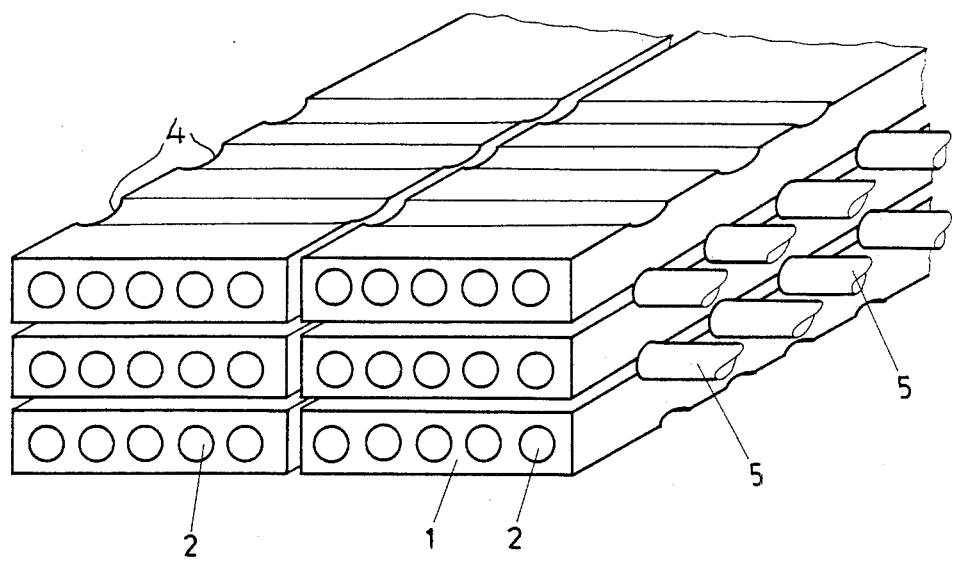
FIG. 3 shows a multiplicty of block modules stacked on top of each other with separate cooling tubes between adjacent modules.

A further embodiment of a block module 1 as illustrated in FIG. 3 exhibits a layer of first through holes 2 adjacent to each other. The wide faces are provided with grooves 4 with approximately semicircular cross-section which run transversely to the first holes 2. Between adjacent block module layers, external cooling tubes 5 are always inserted through which a cooling agent can be fed. The cooling tubes 5 fix the mutual position of the block modules in the module longitudinal direction and, as a consequence of the friction between the cooling tubes 5 and the modules 1, also in the transverse direction.

All the embodiments have in common the fact that as many modules as desired can be stacked on top of each other like building bricks.

Figure 4:
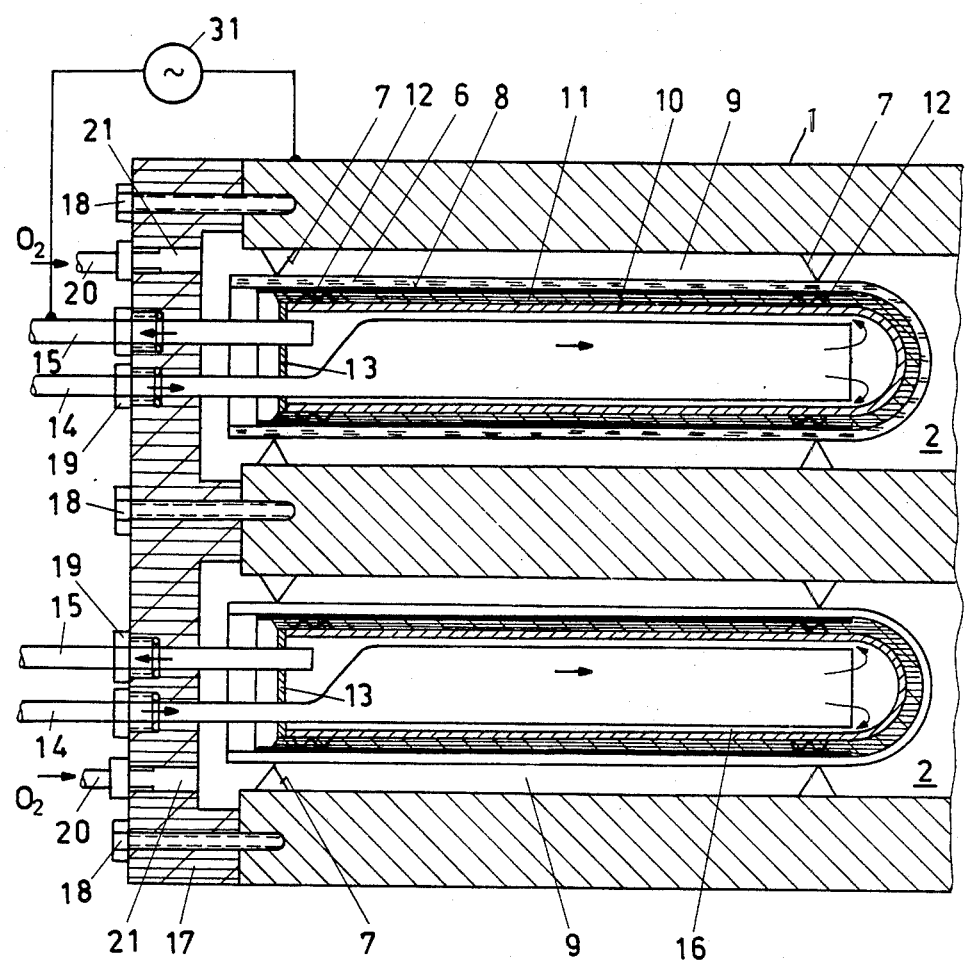
FIG. 4 shows a longitudinal section through a block module according to FIG. 1 with supply and removal of the cooling agent through one and the same end face of the module.

FIG. 4 now shows the manner in which block modules 1 shown in FIG. 1 are disposed in an ozone generator. In the through hole 2 in module 1 a glass tube 6 closed at one end is concentrically mounted by means of spacers 7. The inner wall of the glass tube 6 is provided with a metal layer 8. The annular space between the inner wall of the hole 2 and the outer wall of the glass tube 6 forms the discharge gap 9. The inner wall of the hole 2 and the metal layer 8 respectively form the external electrode at earth potential and the inner electrode at high voltage potential of the ozone generator. In the interior of the glass tube and separated from it on all sides by a gap of preferably 0.5 mm there is disposed an inner cooling tube 10 of high-grade steel closed at one end. The gap is filled up with a heat-resistant synthetic resin compound 11 which conducts heat well. Between the compound 11 and the inner wall of the glass tube 6 there is left only an expansion gap (not drawn) a few 10 $\mu$m wide. For this purpose the compound 11 is preferably an epoxy casting compound such as those developed for the sealing of electrical circuits. Such epoxy casting compounds are remarkable for high temperature resistance (up to 400° C.) and for good thermal conductivity (approx. 0.9 W/m °C.). The metal layer 8 of the glass tube 6 is electrically connected to the cooling tube 10 by contact springs 12 of beryllium bronze embedded in the synthetic resin 11. The contact springs 12 at the same time provide the spacing between the inner cooling tube 10 and the glass tube 6 before the synthetic resin compound 11 is introduced.

The filling up of the gap with synthetic resin compound is preferably carried out as follows: The inner wall of the glass tube 6 is provided with a release agent commonly used in plastic technology (for example, based on Teflon) to prevent adhesion of the synthetic resin compound 11. With the glass tube 6 placed vertically, a suitable quantity of synthetic resin compound 11 is poured into the glass tube 6. Next, the cooling tube 10 is pushed into the synthetic resin compound 11. The cooling tube 10 displaces the synthetic resin compound 11 which penetrates into the gap and at first fills it up completely. After the synthetic resin compound 11 and the cooling tube 10 have cooled, an expansion gap is left between the synthetic resin compound 11 and the inner wall of the glass tube 6 as a result of the heat-induced and resin-technology shrinkage. Regardless of the tolerances of the glass tube 6 and of the cooling tube 10 this expansion gap is a few 10 $\mu$m over the entire circumference. The inner heat sink produced in this way can now freely expand on heating up without forces being transmitted to the glass tube 6 as a result. It has turned out that a gap filled up in this way causes a temperature difference of only approx. 5° C. for a tube loading of 2 kW. The electrical coupling of the inner cooling tube 10 to the metal layer 8 (inner electrode) via the contact springs 12 relieves the stress on the resin in a manner such that it exerts no action in a dielectric sense. No harmful discharges are formed in the synthetic resin compound 11 even at fault points (bubbles).

The inner cooling tube 10 is closed at the lefthand end by a lid 13 through which two pipelines 14 and 15 are fed. The one pipeline 14 extends to a point close to the closed end of the inner cooling tube 10. The other pipeline 15 opens into the cooling tube directly below the lid 13. To intensify the cooling in the region of the wall of the inner cooling tube 10, the pipeline 14 is widened in the interior of the cooling tube in a manner such that a gap 16 only a few millimeters wide is left between the inner pipeline 14 and the wall of the cooling tube 10. The connection of a source of alternation voltage for operating the ozonizer is made on the one hand to the module 1 (outer electrode), which is normally at earth potential, and on the other hand to one of the two pipelines 14 or 15 which are in galvanic contact with the metal layer 8 (inner electrode) via the lid 13 or the inner cooling tube 10 and the contact springs 12. For potential separation between the inner cooling tube 10 or the pipelines 14, 15, insulating paths are connected to the cooling system (not shown in further detail) as part of the two pipelines 14, 15.

The internal cooling reduces large temperature stresses between the dielectric and the cooling tube 10 since the glass, in contrast to single-sided cooling, is not subjected to any high excess temperatures. Temperature stresses are taken up by the expansion gap. As extensive investigations have shown, gap formations occurring by necessity between synthetic resin compound and glass tube are not critical since the width of the gaps are in the range of several hundredths of a millimeter and are therefore negligible.

Both end faces of the block module 1 are sealed by means of a terminal cap 17 of insulating material (e.g., Teflon), in a gastight manner by means of screws 18. The pipelines 14, 15 are led through the cap 17 and sealed with respect to the latter by means of screw connections 19 and secured.

The supply of the oxygen or the oxygen-containing gas mixture to the discharge gap 9 takes place via suitable fittings 20 which are screwed into holes 21 in the cap 17. The removal of the gas mixture enriched with ozone takes place in an analogous manner to this at the opposite end face of the block module.

Figure 5:
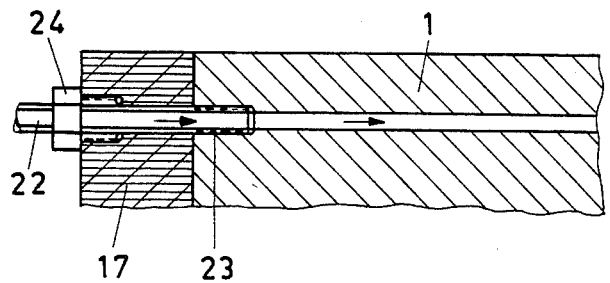
FIG. 5 shows another longitudinal section through the block module according to FIG. 1 in the plane of the cooling agent holes.

FIG. 5 shows a longitudinal section through an ozone generator according to FIG. 4 in the plane of the cooling holes 3 (FIG. 1). At the end face of the module 1, the cooling holes 3 are widened by means of a threaded hole with a root diameter larger than the internal diameter of the cooling holes 3. Into the threaded hole is screwed a tube 22 with an external thread 23 at the end. The tube 22 passes through the cap 17 and is held in the latter by means of a screw connection 24. In the same way the other cooling holes distributed over the block module 1 are connected to an external cooling circuit not shown in further detail.

Figure 6:
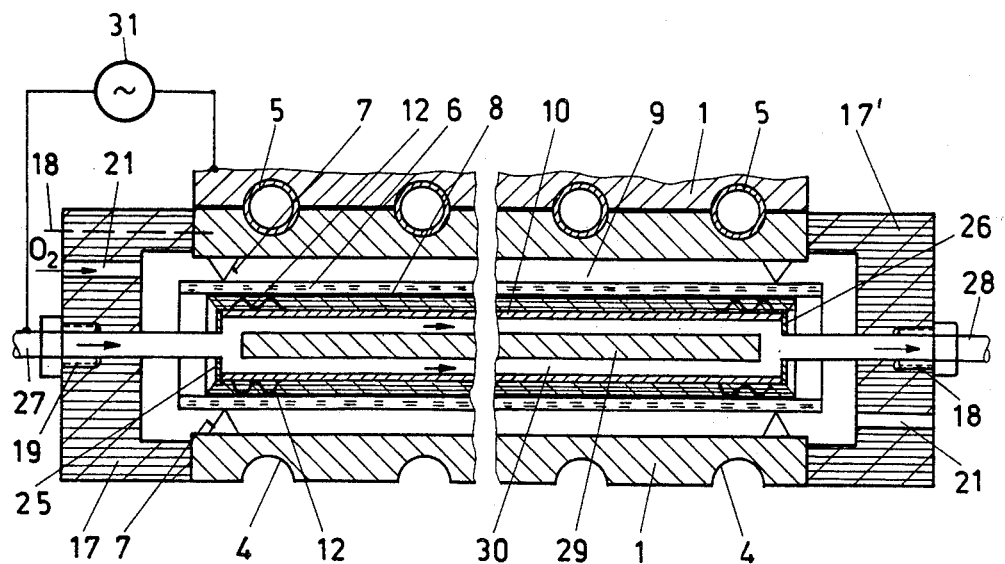
FIG. 6 shows a longitudinal section through a block module according to FIG. 3 with supply and removal of the cooling agent to opposite end faces.

FIG. 6 illustrates an ozone generator containing block modules 1 according to FIG. 3. Apart from the construction of the block module 1, the essential difference from the embodiment according to FIG. 4 consists in the fact that the cooling liquid is supplied at one end face and removed at the other end face. The inner cooling tube 10 has lids 25, 26 at both ends into which a supply pipe 27 or a drain pipe 28 opens. In the interior of the inner cooling tube 10 is disposed a displacement body 29 spaced from the cooling tube walls. In this way the cooling agent is fed along the cooling tube walls in the annular space 30.

In FIG. 6 the external cooling tubes 5 are further perceived. The external cooling tubes 5 are disposed between the block modules 1 stacked on top of each other and are connected to an external cooling circuit not shown. In other respects the remaining additional construction corresponds to the ozone generator according to FIG. 4.

In the exemplary embodiments according to FIGS. 4 and 6, the source of alternating voltage 31 necessary to operate the ozone generator is connected between block module 1 and supply or removal pipe 27 or 28 respectively. The caps 17 or 17 and 17' respectively of insulating material at the same time effect the potential separation required.

Figure 7:
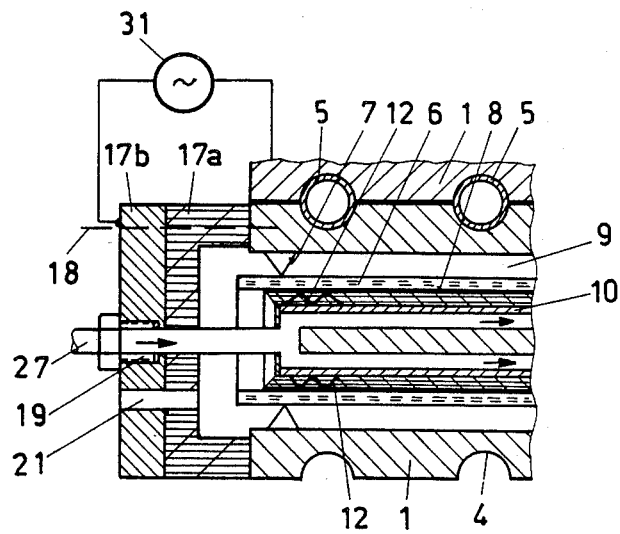
FIG. 7 shows a modification of the ozone generator according to FIG. 6.

FIG. 7 illustrates a modification of the arrangement according to FIG. 6, similar parts being provided with the same reference numbers. In that figure the terminal cap consists of an insulating section 17a and an external terminal plate 17b. The external terminal plate 17b is secured to module 1 by means of insulating screws 18. This design results in a more robust structure, but necessitates increased cost in the potential separation.

In both the embodiments described a metallic casting compound of a low-melting alloy (e.g. Wood's metal) may be used instead of the synthetic resin compound.

Figure 8:
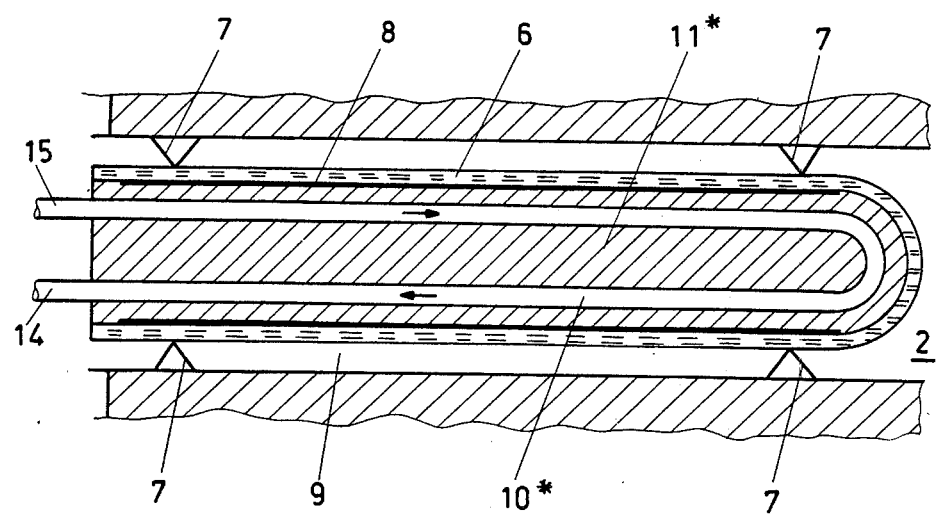
FIG. 8 shows a detail of a modification of the ozone generator according to FIG. 4 with a heat sink bent in the shape of a hair pin.

Because of the increased thermal conductivity compared with a synthetic resin compound, the gaps between the cooling tube 10 and the inner wall of the glass tube 6 can be larger. In the case of the variant according to FIG. 4, where the cooling agent is supplied and also removed again at the same end of the glass tube 6, a cooling tube 10* bent in the shape of a hair pin can be embedded in the metallic casting compound 11* as is illustrated, for example, in the detailed drawing according to FIG. 8. In this case it is possible to do without a special coupling of the cooling tube 10* to the inner electrode 8 since the heat sink (casting compound 11*+cooling tube 10*) rests on the inner electrode at least locally (in the ideal case linearly) and is thus in galvanic contact with the latter.

Obviously, numerous modifications and variations of the present invention are possible in light of the above teachings. It is therefore to be understood that within the scope of the appended claims, the invention may be practiced otherwise than as specifically described herein.

We claim:

1. An ozone generator comprising a plurality of individual ozonizers, said ozone generator comprising:
   (a) a rectangular block of metal containing a plurality of first through holes, the inner wall of each one of said plurality of first through holes forming the outer electrode of one of said plurality of individual ozonizers;
   (b) a plurality of dielectric tubes, each one of said plurality of dielectric tubes being disposed in a corresponding one of said plurality of first through holes, the outer wall of each one of said plurality of dielectric tubes being spaced inwardly from the inner wall of the corresponding one of said plurality of first through holes to define a discharge gap through which oxygen or an oxygen-containing gas mixture can be fed;
   (c) a plurality of inner electrode tubes, each one of said plurality of inner electrode tubes being disposed within a corresponding one of said plurality of dielectric tubes; and
   (d) first means for cooling said rectangular block of metal.

2. An ozone generator as recited in claim 1 wherein said first means comprise a plurality of second throughholes which do not intersect with said plurality of first throughholes and through which a cooling liquid can be fed.

3. An ozone generator as recited in claim 2 wherein each of said plurality of second throughholes is perpendicular to each of said plurality of first throughholes.

4. An ozone generator as recited in claim 2 wherein each of said plurality of second throughholes is parallel to each of said plurality of first throughholes.

5. An ozone generator as recited in claim 1 wherein said first means comprise a plurality of grooves in the surface of said rectangular block of metal.

6. An ozone generator as recited in claim 5 wherein each of said plurality of grooves is at least approximately semicircular in cross-section.

7. An ozone generator as recited in claim 5 wherein each of said plurality of grooves is perpendicular to each of said plurality of first throughholes.

8. An ozone generator as recited in claim 5 comprising:
   (a) a plurality of said rectangular blocks of metal in planar contact with one another such that corresponding grooves in adjacent rectangular blocks are aligned with one another and (b) a plurality of cooling tubes each one of which is disposed in two aligned grooves in adjacent ones of said plurality of rectangular blocks.

9. An ozone generator as recited in claim 1 and further comprising a terminal cap covering the openings of a plurality of said first throughholes, said terminal cap containing a hole for passage of a gas.

10. An ozone generator as recited in claim 1 and further comprising a source of alternating current in electrical contact with said rectangular block of metal and with each of said plurality of inner electrode tubes.

11. An ozone generator as recited in claim 1 and further comprising a plurality of cooling tubes, each of said plurality of cooling tubes being disposed inside a corresponding one of said plurality of inner electrode tubes.

12. An ozone generator as recited in claim 11 and further comprising second means for feeding a cooling liquid through each of said plurality of cooling tubes.

13. An ozone generator as recited in claim 11 wherein each of said plurality of cooling tubes fills the corresponding one of each plurality of inner electrode tubes except for a narrow expansion gap between the outer wall of each cooling tube and the inner wall of each inner electrode tube.

14. An ozone generator as recited in claim 13 wherein said narrow expansion gap is approximately 1 to 1.5 mm in width.

15. An ozone generator as recited in claim 13 wherein said narrow expansion gap is filled with a casting compound.

16. An ozone generator as recited in claim 15 wherein said casting compound is a synthetic resin.

17. An ozone generator as recited in claim 15 wherein said casting compound is metallic.

18. An ozone generator as recited in claim 11 wherein each of said inner electrode tubes and the corresponding one of said cooling tubes are in galvanic connection.

19. An ozone generator as recited in claim 11 wherein:

(a) each of said inner electrode tubes and the corresponding one of said cooling tubes are closed at one end;

(b) each of said inner electrode tubes is sealed at the other end by a lid; and (c) pipelines for supplying and removing cooling liquid to each of said cooling tubes extend through the corresponding one of said lids.

20. An ozone generator as recited in claim 19 wherein:

(a) each of said pipelines for supplying cooling liquid is widened in the interior of the corresponding one of said cooling tubes and (b) an annular gap is formed between the outer wall of the widened portion of each of said pipelines for supplying cooling liquid and the inner wall of the corresponding one of said cooling tubes.

21. An ozone generator as recited in claim 11 wherein:

(a) each of said plurality of dielectric tubes is open at both ends;

(b) each of said plurality of cooling tubes is open at both ends; and (c) a pipeline for supplying or removing cooling liquid opens into each end of each of said plurality of cooling tubes.

22. An ozone generator as recited in claim 21 and further comprising a plurality of displacement bodies, each of said plurality of displacement bodies being disposed in a corresponding one of said plurality of cooling tubes and being spaced from the inner wall thereof.

* * * * *